(12) United States Patent
Bateman

(10) Patent No.: US 6,219,618 B1
(45) Date of Patent: Apr. 17, 2001

(54) AIRCRAFT NAVIGATIONAL WARNING SYSTEM

(76) Inventor: Wesley H. Bateman, 3016 Lillis Ave., Las Vegas, NV (US) 89030

( * ) Notice: Subject to any disclaimer, the term of this patent is extended or adjusted under 35 U.S.C. 154(b) by 0 days.

(21) Appl. No.: 09/236,853

(22) Filed: Jan. 25, 1999

(51) Int. Cl.[7] .............................. G01S 7/78; G06F 17/10
(52) U.S. Cl. .......................... 701/301; 701/13; 701/14; 340/945; 340/961; 244/158 R
(58) Field of Search .................................. 701/9, 13–14, 701/206, 207, 208, 213, 300, 301; 340/425.5, 945, 961, 970; 244/75 R, 158 R

(56) References Cited

U.S. PATENT DOCUMENTS

| | | | |
|---|---|---|---|
| 5,337,982 * | 8/1994 | Sherry | 244/186 |
| 5,442,556 * | 8/1995 | Boyes et al. | 701/9 |
| 5,636,123 * | 6/1997 | Rich et al. | 701/207 |
| 5,892,462 * | 4/1999 | Tran | 340/961 |
| 6,021,374 * | 2/2000 | Wood | 701/301 |

* cited by examiner

Primary Examiner—William A. Cuchlinski, Jr.
Assistant Examiner—Gertrude Arthur
(74) Attorney, Agent, or Firm—Jeffrey D. Moy; Harry M. Weiss; Weiss & Moy, P.C.

(57) ABSTRACT

An aircraft navigational system allows for reduced storage and increased computing power for comparing terrain maps to the flight path and enroute track of the aircraft. Unique provisions are made for reporting and recording navigational hazards.

22 Claims, 3 Drawing Sheets

AIRCRAFT NAVIGATIONAL WARNING SYSTEM

RELATED APPLICATIONS

This application is related to co-pending application Ser. No. 08/873,985 entitled "FLIGHT EVENT RECORD SYSTEM", filed Jun. 13, 1997, in the name of the same inventor and assigned to the same assignee. The specification of the above referenced application is incorporated herein by reference.

FIELD OF THE INVENTION

This invention relates to aircraft, and more specifically, to an aircraft positional location system with navigational hazard warning capabilities.

BACKGROUND OF THE INVENTION

Aircraft navigation requires avoiding land obstacles that have known geographic locations and elevations. One way to ensure that an aircraft does not collide with a land obstacle is to entrust the navigator or pilot to check for obstacles within a flight path. This requires knowledge of the elevation of the aircraft and the terrain in the vicinity of the flight path. It has distinct disadvantages in that it requires vigilance on the part of the navigator and is prone to human error.

Automatic systems have been developed which contain terrain map information for the entire globe or region. These existing systems use radar in conjunction with terrain map information to detect when surface features come within the immediate path of the aircraft. This requires a large amount of storage for the map data and the use of radar limits the predictive ability of the systems. The warning times of these systems are on the order of one minute before collision with a land feature. The present invention reduces storage requirements by only storing the map data corresponding to regions around the flight path of the aircraft or alternatively dynamic loading of map data from a remote storage ground station. It improves safety by comparing terrain features within the flight path each time the aircraft significantly changes speed or altitude. This allows a warning to be updated continuously during the flight of the aircraft. A preferred embodiment of the invention includes interaction with a ground system. The ground system can share the storage of map data for all aircraft serviced by the system and can correlate the exact location of the aircraft with the locations of terrain features. It can then warn the aircraft and/or other navigational facilities of an impending collision with a land obstacle or that a land obstacle is within an alert range. Several levels of warning can be produced with this system.

Technology is already available or is being developed that will allow the practice of the present invention. Global Positioning Systems as described in U.S. Pat. No. 5,594,545 (Devereux, et. al.,) provide positional information to aircraft while in transit. Such a system can be optionally used to provide the positional input to the present invention.

Cellular telephone data communications such as that described in U.S. Pat. No. 4,825,457 can optionally be used to provide the link from the aircraft to a ground station of several embodiments of the present invention. The unique inventive concept of the present invention is the combination of these technologies to achieve an enhanced level of aircraft safety.

In the future, Motorola's IRIDIUM global communications system and Lockheed Martin's Astrolink global communications satellite systems will provide positional information and communications channels which can be used by aircraft enroute. When these technologies are fully available, they can be used in conjunction with the present invention to efficiently produce an improved level of aircraft safety at a low incremental cost.

SUMMARY OF THE INVENTION

Aircraft navigational warning systems and methods are disclosed which compare stored terrain map data to the position and track of an aircraft while the aircraft is enroute. The system is capable of alerting the aircraft operator far in advance of any potential collision with a terrain feature, such as mountains, man-made obstacles, or the ground. Present systems depend on radar in combination with ground map evaluation to provide warnings to the aircraft operators. These systems are typically limited to a one minute response time. The present invention provides continuous or quasi-continuous monitoring of the flight path and elevation of the aircraft and comparison of that data to known terrain data.

The system can also alert a remote site, such as a local ATC (Air Traffic Control) station or a central control station, depending on the application. The system can also provide input data to a FERS (Flight Event Record System) such as the system disclosed in the above referenced patent application. This will allow the personnel diagnosing the cause of a crash to determine whether warnings were generated, why warnings were generated, and whether the aircraft operator responded by ignoring or overriding the warning system.

The foregoing and other objects, features, and advantages of the invention will be apparent from the following, more particular, description of the preferred embodiments of the invention, as illustrated in the accompanying drawings.

BRIEF DESCRIPTION OF THE PREFERRED EMBODIMENTS

The aircraft navigational warning system comprises three distinct embodiments. In one embodiment, the navigational warning system is installed on an aircraft, with only peripheral warning devices in communication with ground systems.

In other embodiments, the navigational warning system comprises an aircraft subsystem and a ground subsystem and the map data is retrieved from storage on the ground.

In the preferred embodiment, the comparison of aircraft position is made in the ground system where processing power can be centralized for efficiency and lowered cost. However, the scope of this invention is not limited to one of the distinct embodiments described. A combination of two or more of the embodiments may be used to further enhance the performance of the system.

DESCRIPTION OF THE EMBODIMENTS OF THE INVENTION

Figure 1:
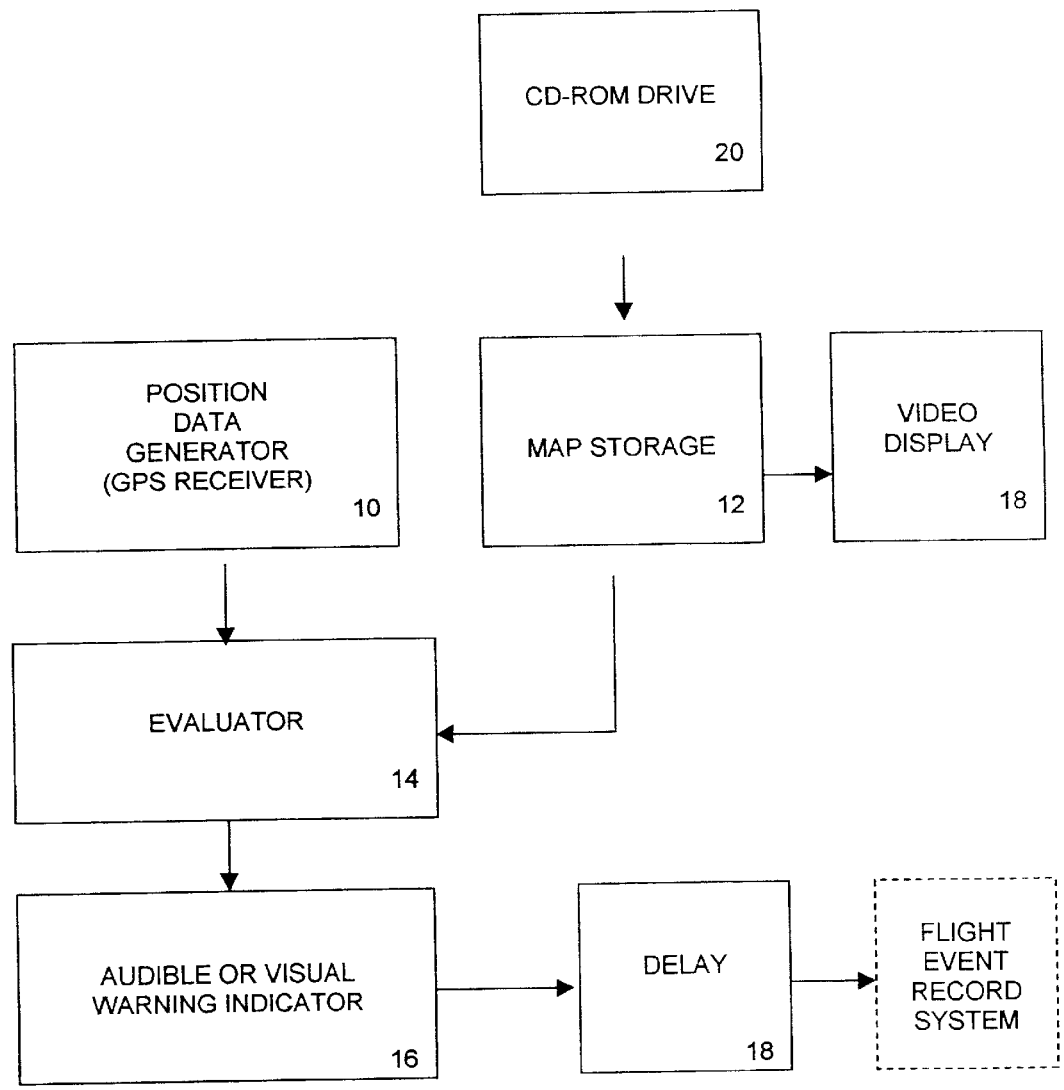
FIG. 1 is a functional block diagram showing the functional components of a first embodiment of the present invention.

Referring to FIG. 1, a functional block diagram of the first embodiment of the aircraft navigational warning system is shown. The position of the aircraft is determined by a Position Data Generator 10, which can comprise a GPS (Global Positioning System) receiver or other means of creating a representation of aircraft position, including elevation.

An Evaluator 14, typically a general purpose microcomputer, compares the position of the aircraft to known terrain data which is stored in a Map Storage 12. Section elevation maps constituting contours can search for features which are within a specified distance of the aircraft or its flight path. Alternatively, vector representations of terrain features can be evaluated mathematically for potential approach by the aircraft. The contour, vector or other representation of the terrain near the aircraft is contained within the Map Storage 12.

This Map Storage 12 is distinguished from other storage systems that utilize a large hard disk system to store maps of the entire surface of the earth. The Map Storage 12 of the present invention could be a smaller hard disk system or a Random Access Memory or other storage means. In the first embodiment of the present invention, terrain maps corresponding to the flight path of the aircraft are uploaded by means of CD-ROM Drive 20, or other equivalent storage means. This allows the memory requirements of the Map Storage 12 to be reduced to a small fraction of what would be required for complete storage of the earth's terrain. An optional Video Display 18 provides visual output of the terrain maps corresponding to the present position of the aircraft, or other maps including those which may constitute a warning condition.

A warning condition can be one of several severity levels. They are to alert the aircraft operator of potential hazards along the flight path of the aircraft in correlation with the elevation of the aircraft. The warning is initiated when the Evaluator 14 calculates that a terrain feature lies within a predetermined distance of the aircraft, or that the aircraft could approach the terrain feature within a predetermined time. The warning levels can be assigned by distance from the aircraft to the terrain feature, or by the length of time calculated before the aircraft will approach the terrain feature. Different terrain features will activate different warning levels, with the severity of the warning indicating the degree of hazard to the aircraft in terms of time and distance to correct the path of the aircraft to avoid the feature. An Audible or Visual Indicator 16 produces a warning output to provide audible, visual or both stimuli to the operator of the aircraft. Optionally, this warning output can be introduced as a portion of flight data recorded by a Flight Event Record System (FERS) as described in the patent application incorporated herein.

An optional Delay 18, provides the capability to not record a warning condition until the operator has had time to respond to the warning. The Audible or Visual Indicator 16 may also incorporate means for overriding the warning when the operator of the aircraft acknowledges the warning. The warning output to the Delay 18, or FERS directly if the Delay 18 is not implemented, may be an output which is not disabled by the override means, or may be an output which is disabled. The provision for disabling warnings to the FERS and the length of the delay may be a function of the severity level of the warning.

The output of the Audible or Visual Indicator could be further used to provide the input to a transmitter such as a cellular telephone communications device. This link could be used to transmit the existence of a warning to a remote ground station. This is a disclosed feature of the FERS system, and thus is not shown explicitly in the drawings, but could be implemented without the complete FERS functionality.

The operation of this embodiment of the aircraft navigational warning system is further embodied in a method for producing a navigational warning. A Map Storage 12 is loaded with a set of terrain maps corresponding to the flight path of the aircraft. The position, including elevation, of the aircraft is then calculated and compared by the evaluator to maps in the map storage. A warning is generated if navigational hazards are found within the flight path of the aircraft.

Figure 2:
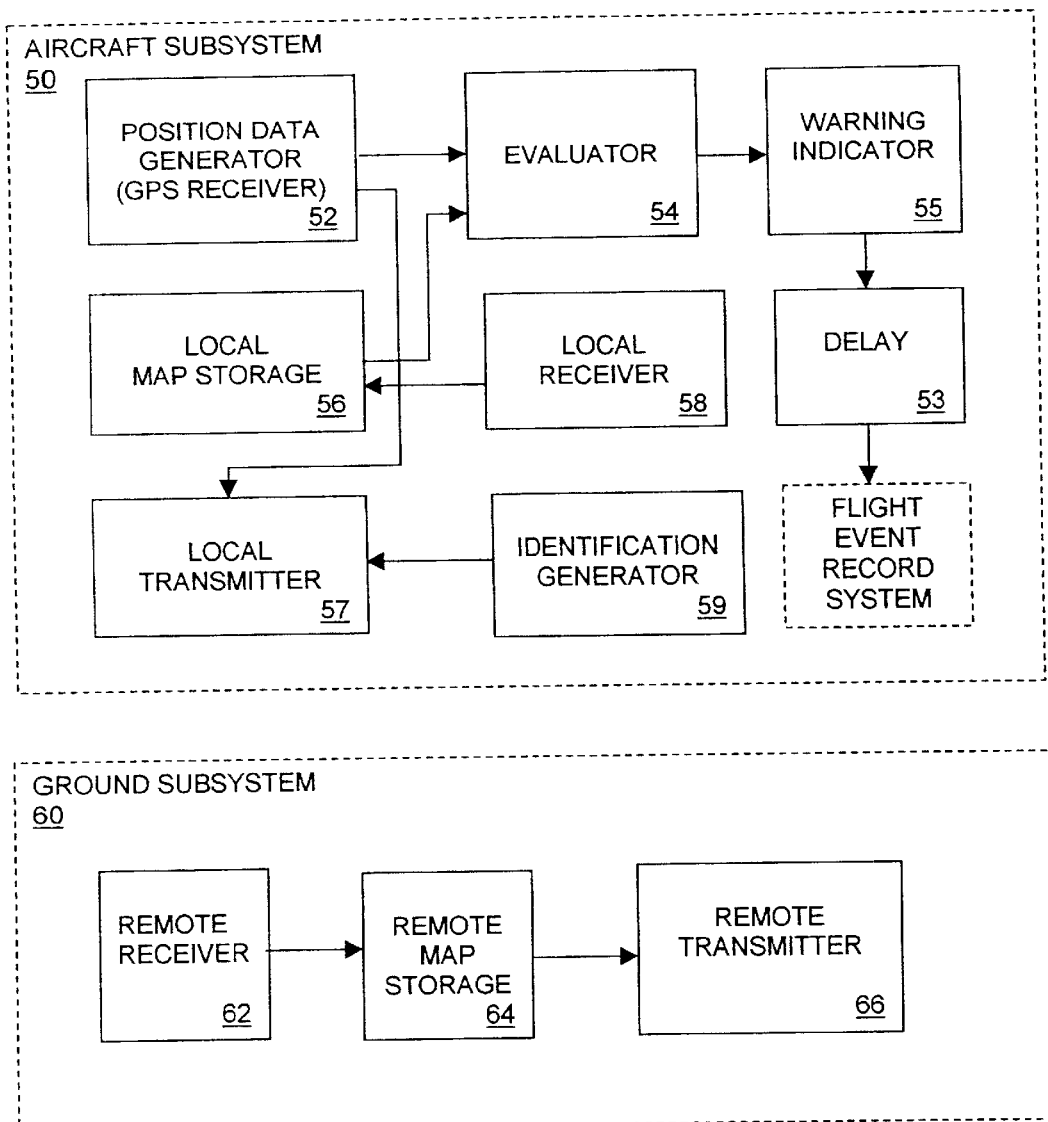
FIG. 2 is a functional block diagram showing the functional components of a second embodiment of the present invention.

Referring to FIG. 2, a second embodiment of the present invention is shown. This embodiment comprises both an aircraft subsystem 50 and a ground subsystem 60. As in the first embodiment, the position of the aircraft is calculated by a Position Data Generator 52. The position of the aircraft is compared with terrain map data stored in Local Map Storage 56, by an Evaluator 54. The Map Storage 56 can be initialized and/or updated by a Local Receiver 58. This Local Receiver 58 receives transmissions from the Ground Subsystem 60. These transmissions comprise map data which correspond to the position of the aircraft and the aircraft's flight path, selected by the ground system based on the position and flight path of the aircraft.

The Aircraft Subsystem 50 requests updated map information by combining an output of the Position Data Generator 52 with a unique identification number generated by the Identification Generator 59 at the Local Transmitter 57. Thus the Local Transmitter 57 transmits a data communication containing unique identification of the aircraft and its position.

The Ground Subsystem 60 contains a Remote Receiver 62, which receives the information transmitted by Local Transmitter 57. This Remote Receiver produces an output to a Remote Map Storage 64, which can contain a large terrain map database. This Remote Map Storage 64 can service many planes at once, the Remote Receiver 62 can support as many channels as are practicable. The Local Transmitter 57 and Remote Receiver 62 will typically comprise cellular telephone communications equipment. Other types of communications such as standard radio sets or microwave communication links could also be used.

The Remote Transmitter 66, also typically a cellular telephone communications transmitter, and preferably operating within the same channel as the Local Transmitter 57 and Remote Receiver 62, transmits map data retrieved from the Remote Map Storage 64. The particular map data retrieved is selected by the Remote Receiver 62 output. This output data corresponds to the aircraft position and identification information transmitted by the Local Transmitter 57. The Remote Receiver 62 receives the position of the aircraft. The Remote Map Storage 64, retrieves map data corresponding to the position and flight path of the aircraft, and the Remote Transmitter 66 transmits the retrieved map data to the aircraft.

The remainder of the second embodiment performs as the first. The output of the Evaluator 54, typically a general-purpose microcomputer, produces an audible and/or visual warning by means of Warning Indicator 55. The output of the Warning Indicator can be processed by Delay 53 into an FERS in order to record and/or transmit the existence of a warning to a remote site. The cellular or other communications apparatus used by the FERS to transmit the warning can be shared in common with the Local Transmitter 57 and Local Receiver 58 and can comprise a single bi-directional cellular telephone link.

The operation of this embodiment of the aircraft navigational warning system is further embodied in a method for producing a navigational warning. The position, including elevation, of the aircraft is calculated and transmitted along with a unique identification code. This position and identification are received at a ground station. Map data corresponding to the position and flight path of the aircraft are transmitted by the ground station. This map data is received by the aircraft and compared to the aircraft position and a warning is generated if navigational hazards are found within the flight path of the aircraft.

Figure 3:
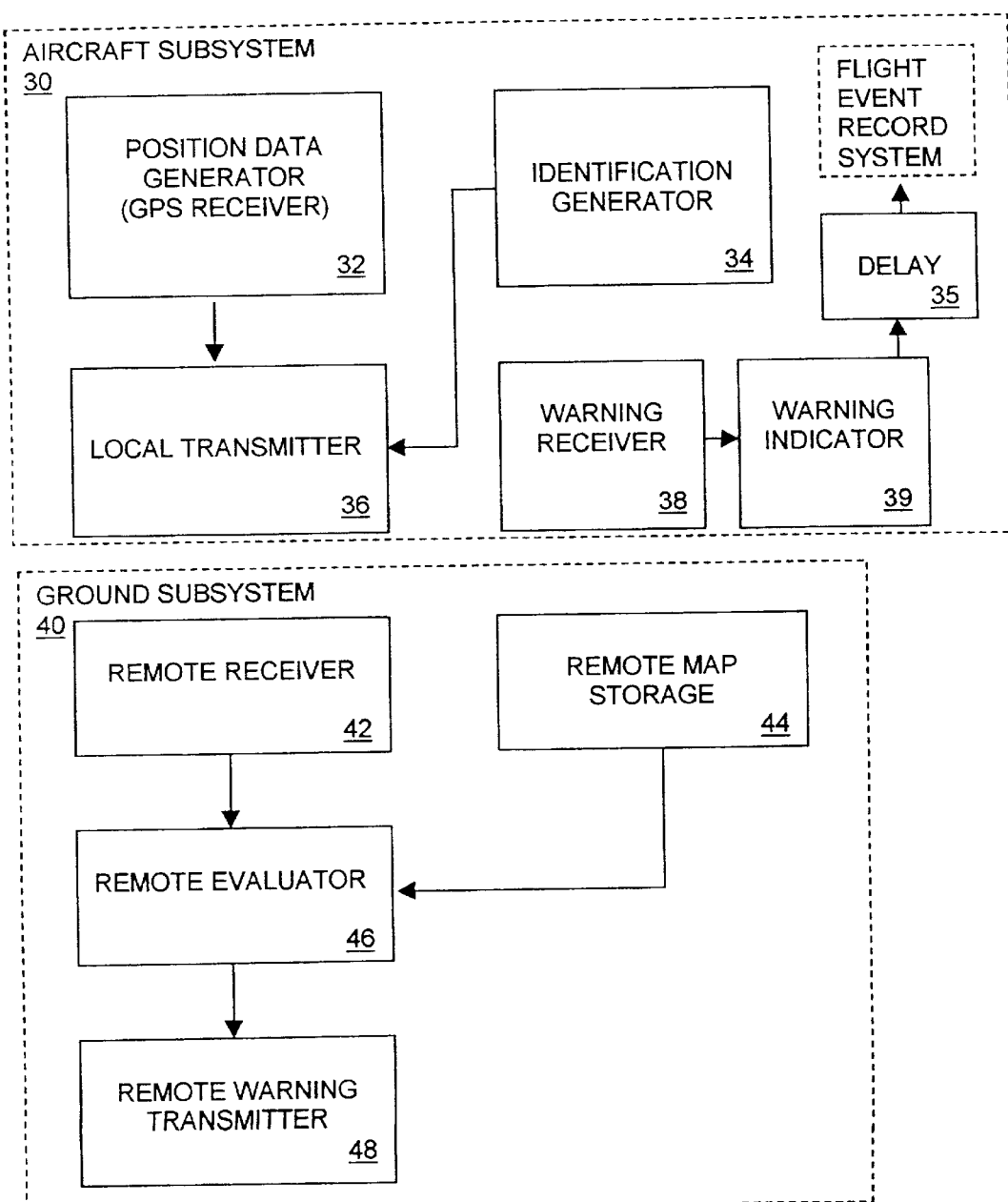
FIG. 3 is a functional block diagram showing the functional components of a third and preferred embodiment of the present invention.

Referring to FIG. 3, the preferred embodiment of the invention is shown. This embodiment locates the evaluation and storage of map data in the ground station. The Remote Evaluator 46 in the ground station typically comprises a mainframe high-power computer such as "Big Blue" produced by International Business Machines. This allows maximum availability of storage for detailed terrain maps and great processing power availability for comparison of aircraft positions to the terrain map data. The Aircraft Subsystem 30, calculates the aircraft position by means of a Position Data Generator 32, typically a Global Positioning System receiver. An unique identification code is produced by the Identification Generator 34. The Local Transmitter 36, typically a cellular telephone communications transmitter, combines the output of the Identification Generator 34 and the Position Data Generator 32 and transmits the combined information to the Ground Subsystem 40.

The Remote Receiver 42 receives the identification and position of all aircraft using the system and the Remote Evaluator 46 compares terrain map data stored in the Remote Map Storage 44 with the positions of each aircraft in communication with the Ground Subsystem 40. If a terrain hazard is detected, the Remote Evaluator 46, outputs a warning to the Remote Warning Transmitter 48, which typically comprises a cellular telephone communications transmitter, typically using the same communications link established by the Local Transmitter 36 in the Aircraft Subsystem 30.

The transmission of the Remote Warning Transmitter 48 for a particular aircraft will be received by Warning Receiver 38, which produces an audible or visual warning by means of Warning Indicator 39. A warning output from the Warning Indicator 39 can be processed by Delay 35 and an FERS as described in the description of the first and second embodiments.

The operation of the preferred embodiment of the aircraft navigational warning system is further embodied in a method for producing a navigational warning. The position, including elevation, of the aircraft is calculated and transmitted along with a unique identification code. This position and identification are received at a ground station. The ground station transmits a warning transmission if the position of the aircraft indicates that the aircraft is in danger of colliding with a terrain feature and the aircraft receives this transmission and produces a warning indication to the operator of the aircraft.

In all of the embodiments of the disclosed invention, the representation of terrain map data within the map storage and as used in calculations by the evaluators can take many forms. A useful and efficient format for terrain data is that used by the program "Draw Land" in use by the United States armed forces. Data may be compressed, represented in vector form, or otherwise stored and operated on without departing from the spirit and scope of this invention.

In embodiments of the invention which incorporate an FERS as disclosed in the referenced patent application, many common blocks may be shared. The production of identification codes for the aircraft, the cellular communications equipment, and the Global Positioning System receivers may be interfaced in common and share the same general purpose microcomputer or microprocessor to provide control and/or communications functions.

While the invention has been particularly shown and described with reference to the preferred embodiments thereof, it will be understood by those skilled in the art that the foregoing and other changes in form, and details may be made therein without departing from the spirit and scope of the invention.

What is claimed is:

1. An aircraft navigational warning system comprising:
    a position data generator installed on an aircraft for producing a position data representation of the position of said aircraft;
    a map storage unit containing a multiplicity of terrain maps corresponding to the flight path of said aircraft for storing said multiplicity of terrain maps;
    an evaluator coupled to said position data generator and further coupled to said map storage unit for comparing said position data representation to at least one of said multiplicity of terrain maps corresponding to the flight path of said aircraft; and
    a warning indicator coupled to said evaluator for producing a warning signal when said evaluator calculates that a projected position of said aircraft and a position of upcoming terrain on the flight path of said aircraft are separated by less than a safe distance or time of approach.

2. An aircraft navigational warning system in accordance with claim 1 wherein said position data generator comprises a Global Positioning System receiver.

3. An aircraft navigational warning system in accordance with claim 1 wherein said map storage unit comprises a computer memory.

4. An aircraft navigational warning system in accordance with claim 1 wherein and said map storage unit is initialized from a plurality of CD-ROM discs containing terrain map data.

5. An aircraft navigational warning system in accordance with claim 1 further comprising a visual display coupled to said map storage unit for displaying map data extracted from at least one of said multiplicity of terrain maps.

6. An aircraft navigational warning system in accordance with claim 1 further comprising a warning transmitter coupled to said evaluator for transmitting an output of said warning indicator to a ground receiver for informing ground personnel of a danger to said aircraft.

7. An aircraft navigational warning system in accordance with claim 6 wherein said warning transmitter comprises a cellular telephone communications transmitter.

8. An aircraft navigational warning system in accordance with claim 1 wherein an output of said evaluator is an input to a flight event recording system installed on said aircraft.

9. An aircraft navigational warning system in accordance with claim 8 wherein said output is activated after said warning indication has been present for a predetermined amount of time.

10. An aircraft navigational warning system comprising:
    a position data generator installed on an aircraft for producing a position data representation of the position of said aircraft;
    an identification generator for generating an identification code unique to said aircraft;

a transmitter installed on said aircraft and coupled to said position data generator and further coupled to said identification generator for transmitting said position data representation and identification code;

at least one remote receiver for receiving said position data representation and identification code;

at least one remote map storage unit containing a multiplicity of terrain maps;

at least one remote evaluator coupled to said at least one remote receiver and further coupled to said at least one remote map storage unit for comparing said position data representation with said multiplicity of terrain maps;

at least one remote warning transmitter coupled to said at least one remote evaluator for producing a warning transmission when said at least one remote evaluator calculates that a projected position of said aircraft and a position of upcoming terrain on the flight path of said aircraft are separated by less than a safe distance or time of approach;

a warning receiver installed on said aircraft for receiving said warning transmission; and a warning indicator coupled to said warning receiver for producing a visual or audible warning to the operator of said aircraft when said warning transmission is received.

11. An aircraft navigational warning system in accordance with claim 10 wherein an output of said warning receiver is input to a flight event record system installed on said aircraft.

12. An aircraft navigational warning system in accordance with claim 11 wherein said output is activated after said warning indication has been present for a predetermined amount of time.

13. An aircraft navigational warning system in accordance with claim 10 wherein said position data generator comprises a Global Positioning System receiver.

14. An aircraft navigational warning system in accordance with claim 10 wherein said transmitter comprises a cellular telephone communication transmitter and said at least one receiver comprises a cellular telephone communication receiver.

15. An aircraft navigational warning system in accordance with claim 10 wherein said at least one remote warning transmitter comprises a cellular telephone communication transmitter and said warning receiver comprises a cellular telephone communication receiver.

16. An aircraft navigational warning system comprising:

a position data generator installed on said aircraft for producing a position data representation of the position of said aircraft;

an identification generator for generating an identification code unique to said aircraft;

a local transmitter installed on said aircraft and coupled to said position data generator and further coupled to said identification generator for transmitting said position data representation and identification code;

at least one remote receiver for receiving said position data representation and identification code;

at least one remote map storage unit containing a multiplicity of terrain maps, coupled to said at least one remote receiver;

at least one remote transmitter coupled to said map storage unit for transmitting map data corresponding to said position data representation;

a local receiver installed on said aircraft for receiving map data from said at least one transmitter;

a local map storage unit coupled to said local receiver for storing received map data;

an evaluator coupled to said position data generator and further coupled to said local map storage unit for comparing said position data representation with said received map data; and a warning indicator coupled to said evaluator for producing a visual or audible warning to the operator of said aircraft when said evaluator calculates that a projected position of said aircraft and a position of upcoming terrain on the flight path of said aircraft are separated by less than a safe distance or time of approach.

17. An aircraft navigational warning system in accordance with claim 16 wherein said local transmitter comprises a cellular telephone communications transmitter and said at least one remote receiver comprises a cellular telephone communications receiver.

18. An aircraft navigational warning system in accordance with claim 16 wherein said at least one remote transmitter comprises a cellular telephone communications transmitter and said local receiver comprises a cellular telephone communications receiver.

19. An aircraft navigational warning system in accordance with claim 16 wherein said local transmitter further transmits an output of said warning indicator to said at least one remote receiver for informing ground personnel of a danger to said aircraft.

20. An aircraft navigational warning system in accordance with claim 16 wherein said position data generator comprises a Global Positioning System receiver.

21. An aircraft navigational warning system in accordance with claim 16 wherein an output of said warning receiver is input to a flight event record system installed on said aircraft.

22. An aircraft navigational warning system in accordance with claim 21 wherein said output is activated after said warning indication has been present for a predetermined amount of time.

* * * * *